United States Patent [19]
Ishikawa et al.

[11] Patent Number: 5,926,292
[45] Date of Patent: Jul. 20, 1999

[54] IMAGE PROCESSING APPARATUS

[75] Inventors: Hisashi Ishikawa, Saitama-ken; Hideo Homma, Tokyo; Yoshitake Nagashima, Chigasaki; Takashi Saito, Yokohama, all of Japan

[73] Assignee: Canon Kabushiki Kaisha, Tokyo, Japan

[21] Appl. No.: 08/883,155

[22] Filed: Jun. 26, 1997

Related U.S. Application Data

[60] Continuation of application No. 08/506,188, Jul. 24, 1995, abandoned, which is a division of application No. 08/225,973, Apr. 12, 1994, Pat. No. 5,465,173, which is a continuation of application No. 08/103,168, Aug. 6, 1993, Pat. No. 5,321,532, which is a continuation of application No. 08/013,194, Jan. 29, 1992, abandoned, which is a continuation of application No. 07/616,210, Nov. 20, 1990, abandoned.

[51] Int. Cl.$^6$ ................................................. H04N 1/40
[52] U.S. Cl. ...................................... 358/534; 358/433
[58] Field of Search ................................. 358/534–536, 358/524, 538, 456, 458, 426, 433

[56] References Cited

U.S. PATENT DOCUMENTS

| | | | |
|---|---|---|---|
| 3,555,262 | 1/1971 | Shimada | 358/79 |
| 4,349,835 | 9/1982 | Horiguchi et al. | 358/80 |
| 4,578,704 | 3/1986 | Gharavi | 358/433 |
| 4,723,298 | 2/1988 | Schiller | 358/433 |
| 4,884,130 | 11/1989 | Huntsman | 358/75 |
| 4,918,541 | 4/1990 | Ishida et al. | 358/433 |
| 4,949,188 | 8/1990 | Sato | 358/448 |
| 5,003,474 | 3/1991 | Ng | 358/80 |
| 5,070,413 | 12/1991 | Sullivan et al. | 358/75 |

Primary Examiner—Thomas D. Lee
Assistant Examiner—Stephen Brinich
Attorney, Agent, or Firm—Fitzpatrick, Cella, Harper & Scinto

[57] ABSTRACT

An image processing apparatus has a memory device for storing pixel image data including both halftone image data such as data of image of a photograph having a gradation and line image data such as data of text containing characters. The storage is conducted on the basis of blocks each having a predetermined number of pixels. The mean information quantity of the halftone image data per pixel stored in the memory means is not greater than the information quantity of the line image data per pixel stored in the memory means. The halftone image data being compressed on the basis of the block. Therefore, both the halftone image data and line image data can be stored in a small memory by using common addresses, without causing any degradation of the image quality.

16 Claims, 13 Drawing Sheets

IMAGE PROCESSING APPARATUS

This application is a continuation of application Ser. No. 08/506,188 filed Jul. 24, 1995, now abandoned, which a division of application Ser. No. 08/225,973 filed on Apr. 12, 1994, now U.S. Pat. No. 5,465,173, which is a continuation of application Ser. No. 08/103,168 filed Aug. 6, 1993, now U.S. Pat. No. 5,321,522, which is a continuation of application Ser. No. 08/013,194 filed on Jan. 29, 1992, now abandoned, which is a continuation of application Ser. No. 07/616,210 filed Nov. 20, 1990, now abandoned.

BACKGROUND OF THE INVENTION

1. Field of the Invention

The present invention relates to an image processing apparatus and, more particularly, to an image processing apparatus having a function for storing an image containing both pixel information of line images such as characters, graphs or the like (referred to as "text", hereinafter) and pixel information of halftone images having gradation such as the image of a photograph.

2. Related Background Art

In general, storage of a text requires a high resolution for ensuring smoothness and continuity of oblique lines and so forth. On the other hand, storage of an image requires a high level of gradation in order to avert from any deterioration of the image quality due to false profile. Conventionally, therefore, the memory device of image processing apparatus of the kind described has been constructed to have pixels of a number large enough to ensure high smoothness and continuity of oblique lines and gradations of a number which is large enough to prevent degradation of image quality due to false contour, as shown in FIG. 4.

According to the conventional memory device described above, enormous pixels and gradations are necessary for obtaining high qualities of the text and image. This requires a correspondingly large storage capacity of the memory device, resulting in an impractically large scale and cost of the hardware. For instance, when 256 gradation levels are used, 8 bits per pixel are required for expressing gradation. That is, a memory capacity required is 8 times as large that required for storing the text alone which used one bit for each pixel.

Thus, the conventional memory device is disadvantageous in that a large scale and huge cost are required for the hardware due to employment of great numbers of pixels and gradations, in order to obtain high qualities of the text and image. This problem is serious particularly in the case of storage of full-color images because the required memory capacity is triple due to the necessity for 3 planes for three primary colors of red, green and blue. For instance, when the gradations of each of the R, G and B planes is 256, 24 bits per pixel are necessary for the full-color display, which is 24 times as large that required in the case of storage of monochromatic text which requires only one bit per pixel.

Under these circumstances, the same applicant has proposed, in Japanese Patent Application Laid-open No. 62-92070, an art in which resolution is increased for text while gradation is enhanced for image so as to enable both text data and image data co-exist in the same memory.

Proposed also are techniques in which representative color in a block is extracted and coded to enable compression of the data in the block, as in U.S. patent application Ser. No. 185,024 filed on Apr. 21, 1988 and U.S. patent application Ser. No. 362,014 filed on Jun. 6, 1988.

These proposals, however, cannot solve the problems of the known arts satisfactorily and there still exists demand for further improvement.

SUMMARY OF THE INVENTION

Accordingly, an object of the present invention is to provide an image processing apparatus capable of overcoming the above-described problems of the known arts.

Another object of the present invention is to provide an image processing apparatus capable storing an image containing both a text image and gradation image, improved to maintain good qualities of both images without requiring any increase in the memory capacity.

To these ends, according to one aspect of the present invention, there is provided an image processing apparatus comprising: memory means for storing, on the basis of blocks each having a predetermined number of pixels, pixel image data including both halftone image data and line image data; wherein the mean information quantity of the halftone image data per pixel stored in the memory means is not greater than the mean information quantity of the line image data per pixel stored in the memory means, the halftone image data being compressed on the basis of the block.

Still another object of the invention is to facilitate an address control when both halftone image data and line image data commonly exist in a memory device.

To this end, according to another aspect of the invention, there is provided an image processing apparatus comprising: memory means for storing, on the basis of blocks each having a predetermined number of pixels, pixel data of one frame including both halftone image data and line image data; means for controlling writing of the data in the memory means; wherein the memory means store the halftone image pixel data while compressing the data quantity thereof, and the control means uses common addresses in writing the halftone image pixel data and the line image pixel data in the memory means.

A further object of the present invention is to enable halftone processing in good order.

To this end, according to still another aspect of the present invention, there is provided an image processing apparatus comprising: memory means for storing data carried by pixels; judging means for judging whether the pixel data read from the memory means is halftone image data or not; and halftone processing means for conducting a halftone processing on pixel data which has been judged as being halftone image data by the judging means, using peripheral pixel data on the pixels around the pixels carrying the halftone image data.

A still further object of the present invention is to provide an image processing apparatus capable of storing both text data and image data, capable of maintaining good qualities of color image and text without requiring the memory capacity to be increased.

To this end, according to a further object of the invention, there is provided an image processing apparatus comprising: judging means for judging whether input data is halftone image data or not; coding means for extracting, when the input data is judged to be halftone image data by the judging means, a representative color of the input data on the bass of pixel blocks each having a predetermined number of pixels, and coding the extracted representative color; a first memory for storing the code coded by the coding means; and a second memory for storing the input data when the input data is judged by the judging means to be halftone image data.

A still further object of the present invention is to provide an image processing apparatus which can be used in combination with a computer or the like device for outputting image data from such a device.

A still further object of the invention is to provide an image processing apparatus having a simple construction but yet capable of providing an image of a high quality.

A still further object of the present invention is to enable a diversified image processing.

Other objects and features of the present invention will become clear from the following description taken in conjunction with the accompanying drawings, as well as from the statement of claims.

DESCRIPTION OF THE PREFERRED EMBODIMENTS

Preferred embodiments of the present invention will be described with reference to the accompanying drawings.

Figure 1A:
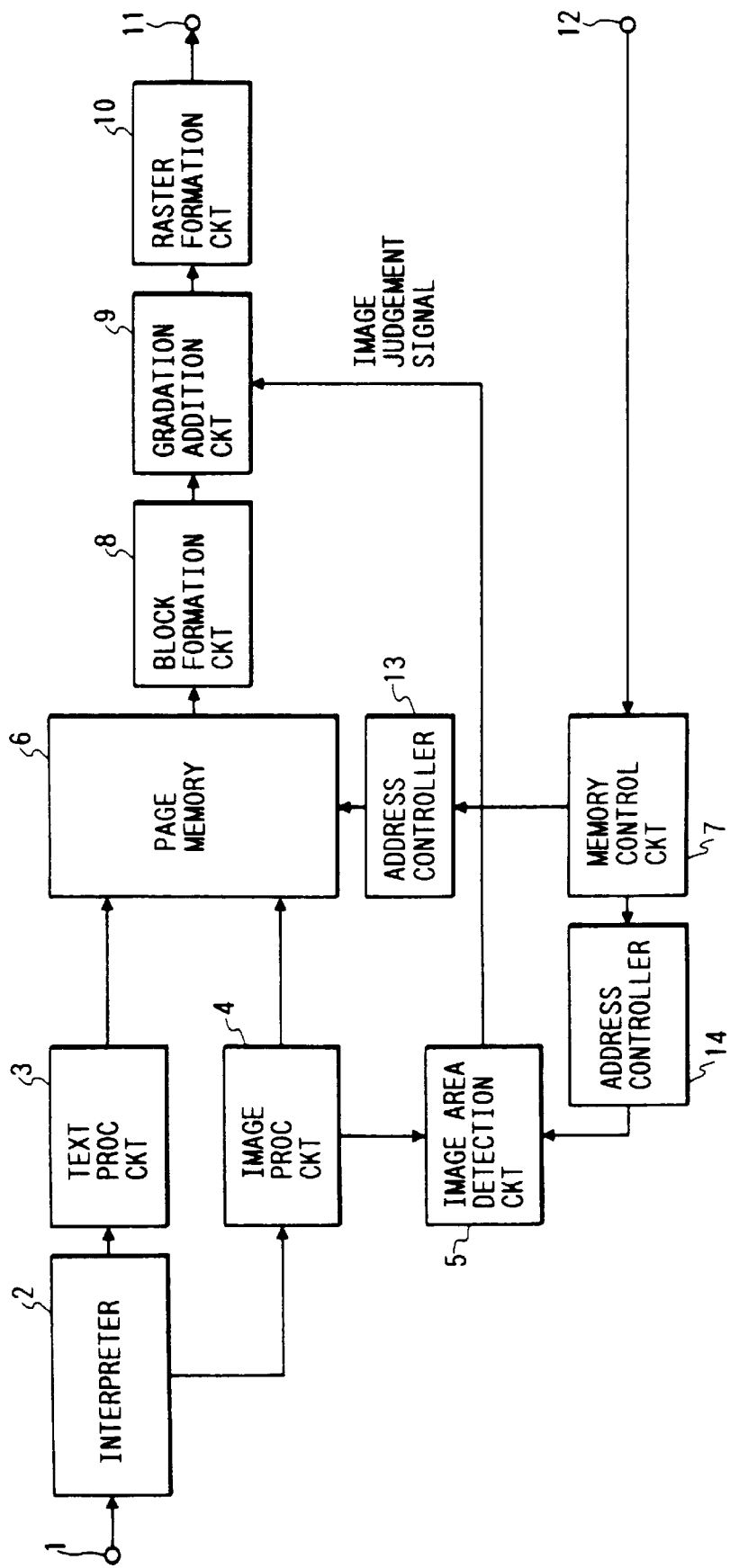
FIGS. 1A to 1D are block diagrams of an image processing unit of a page printer as an embodiment of the present invention.

FIG. 1A is a block diagram of a first embodiment of the image processing apparatus of the present invention, more particularly an image processing portion of a page printer. The term "page printer" is used to mean a printer having a memory capable of storing data of one page. The memory may be a binary memory or a memory of other notation. The image processing portion has an input terminal 1 which receives command and data from a host device such as a host computer, an image reader or the like. The input command and data are delivered to an interpreter 2 which interprets them in accordance with the content of the command and additional information such as a header. The text data (character data) are delivered to a text processing circuit 3, while image data such as photograph data are supplied to an image processing circuit 4. The command includes, for example, a post-script which is a page description language (PDL). The text processing circuit 3 develops the text data into pixels which are the smallest units of the memory and writes the same in a page memory 6. The image processing circuit 4 conducts processing of the image data, e.g., expansion or contraction, in accordance with the command and, thereafter, develops a plurality of bits having image gradation information into pixels in accordance with a predetermined rule and writes the same also in the page memory 6. At the same time, the image processing circuit 4 inputs an image area information indicating the image area to the image area detecting circuit 5. The image area detecting circuit 5 judges whether the data written in the page memory 6 is text data or image data, in accordance with the image area information, for each of blocks each having N (N=m×n) pixels (N being an integer of 2 or greater), and stores the result of the judgment in the area judging memory. The image area detecting circuit 5 also reads the results of the judgment from the area judging memory in accordance with a timing which is input through a memory control circuit 7 and delivers the read out data to a gradation adding circuit 9 as an image judging signal.

The image area detecting circuit 5 has an area judging memory in which, for instance, one bit is allocated for each of the blocks in the page memory 6, and executes the following steps of: (1) initializing bits on the area judging memory to "0"; (2) each time the image processing circuit 4 writes data in the page memory 6; changing the corresponding bit on the area judging memory to "1", (3) inputting, in correspondence with the reading from the page memory 6, the bit data of the area judging memory to the gradation adding circuit 9 as image judging signal; and (4) writing "0" in the area judging memory for initialization.

In this case, therefore, the area judging memory is required to have a capacity which is 1/S the memory capacity of the page memory 6, where S represents the quantizing bit number of the image pixel.

Figure 1B:
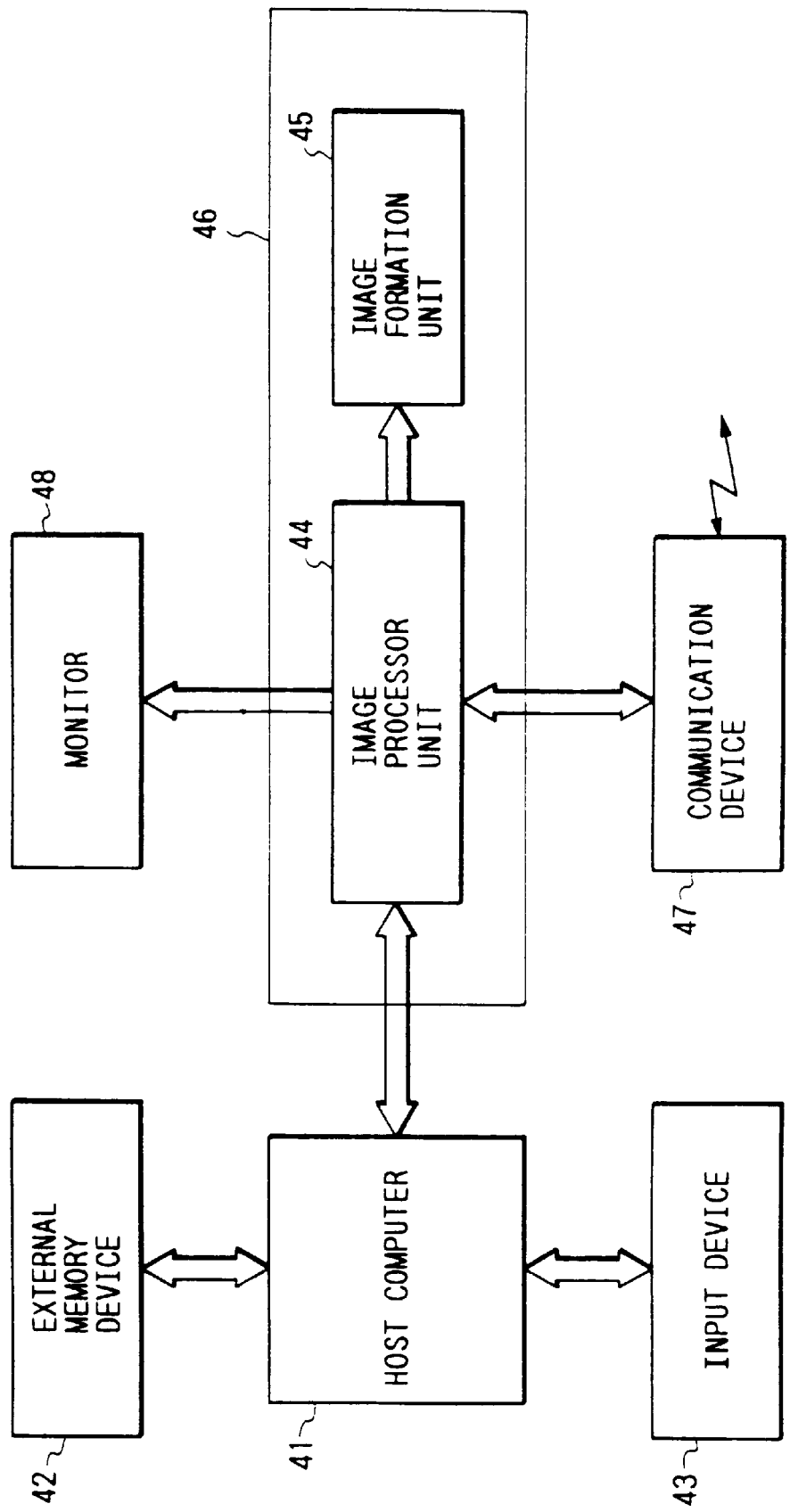
Figure 1C:
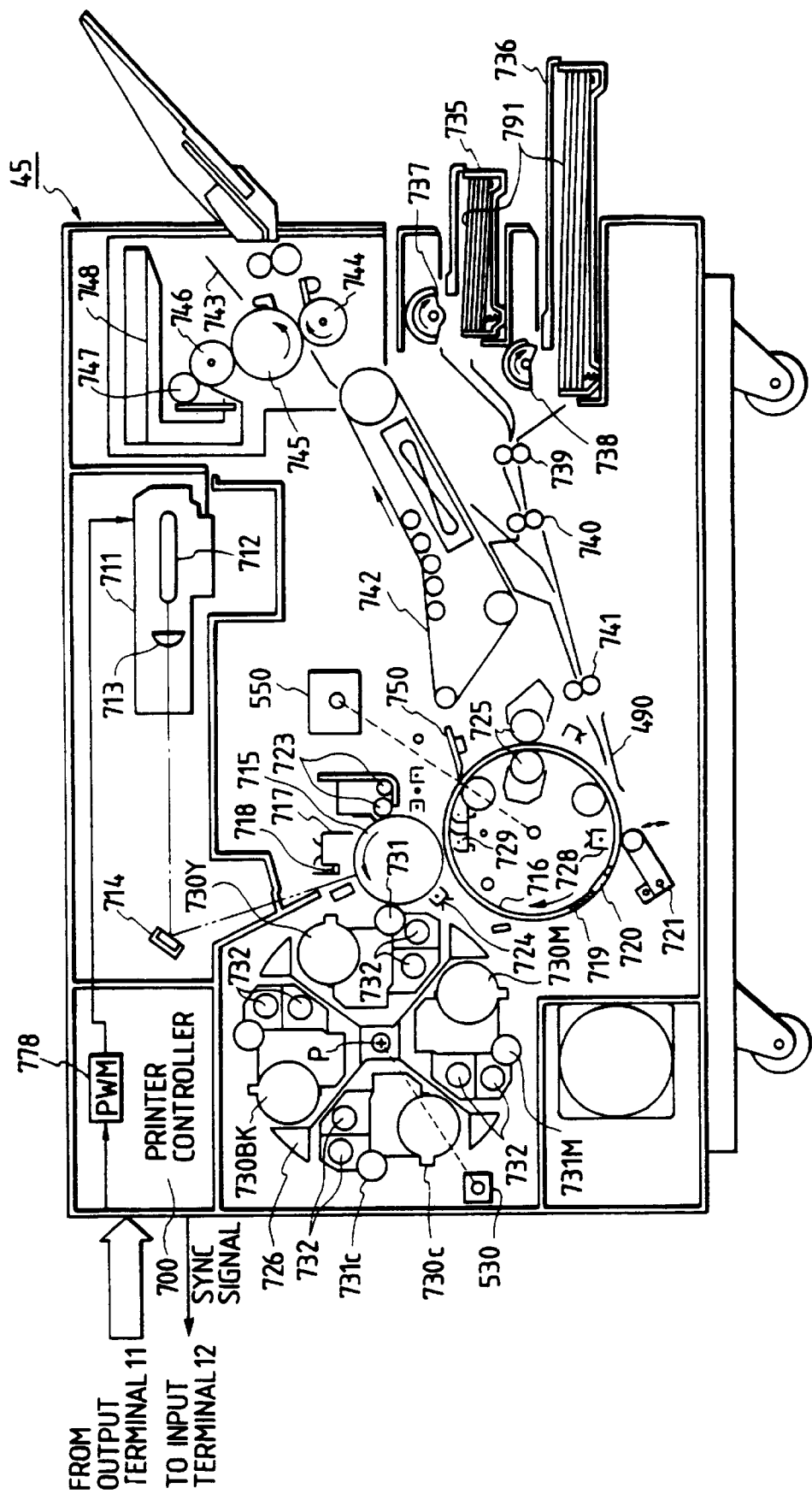

The image processing portion also has another input terminal 12 which receives a synchronizing signal from an image formation unit 45 (see FIG. 1B). The memory control circuit 7 controls the output port of the page memory 6 in accordance with the synchronizing signal. The page memory 6 is a dual port RAM having a capacity corresponding to pixels of one page of text data. The page memory 6 has an input random access port connected to the text processing circuit 3 and the image processing circuit 4 and an output serial access port which is connected to a block forming circuit 8. Thus, the signals processed by the text processing circuit 3 and the image processing circuit 4 are stored in the corresponding addresses in the page memory 6 through the random access port.

The image processing unit also has an output terminal 11 which is connected to a printer head of the image forming unit 45 shown in FIG. 1B, while the serial port of the page memory 6 delivers to the block forming circuit 8 the data from the leading end of the page in accordance with the synchronizing signal received from the image forming unit 45. The print signal from the page memory 6 is divided into blocks each having N (N=m×n) pixels corresponding to the above-mentioned blocks for area judgment so as to form N-bit data which are input to the gradation adding circuit 9. The gradation adding circuit 9 operates in accordance with the aforementioned image judging signal delivered from the image area detection circuit 5 so as to determine that, when the block is within the image area, the N bit data is gradation data and treats the gradations of all (N) pixels in the block as N-bit data. On the other hand, when the block is within the text area, i.e., when the block is out of the image area, the gradation adding circuit 9 operates to examine the bits of the N pixels. When the bit is "0", the circuit delivers a predetermined background gradation data which is usually "0" for all bits. Conversely, when the bit is "1", the circuit 9 delivers a predetermined character gradation data which is usually "1" for all bits. Thus, all the pixels in a block belonging to the image area are set to the same gradation, whereas, in the test area, the pixels on which lines of characters are written are set to the character gradation and pixels in on which no character line is written are set to the background gradation. The pixel data with the gradation information thus added by the gradation adding circuit 9 are input to a raster circuit 10 which converts the pixel data into raster signals conforming with the scanning of the printer. The thus formed raster signal is then delivered to the printer head (not shown) of the image forming unit 45 of FIG. 1B through the output terminal 11.

The address controllers 13 and 14 conducts address controls for writing and reading data to and from the page memory 6 and the area judging memory of the image area detecting circuit 5, respectively. These address controllers are controlled by a memory control circuit 7. The address controller 13 controls both the line image data from the text processing circuit 3 and the halftone image data from the image processing circuit 4, using common addresses.

Figure 2A:
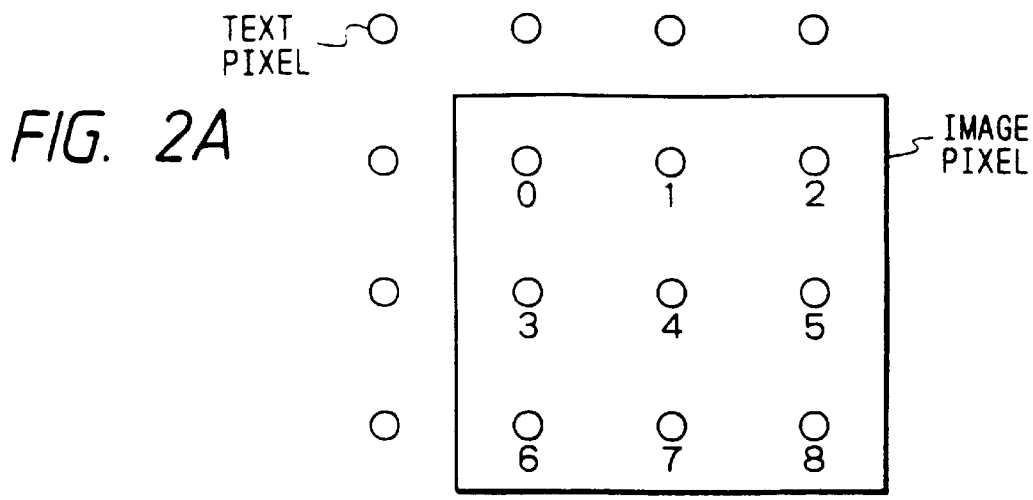
FIGS. 2A and 2B are illustration of relationships between gradation data of image pixel and text pixel.

Assuming that the gradation number of the image pixel is $2^9=512$, all the gradation levels can be expressed by $3\times3=9$ bits. It is therefore possible to store the gradation levels of the image pixels by forming a block by three lines and three columns of text pixels (M=n=3) as shown in FIG. 2A, setting the bit data concerning the gradations of the image pixel in the block and reconstructing the gradation data when reading the pixel data. However, the following problem is encountered. For instance, if the mean value or the central value of the pixels in a block is extracted and used as the values of pixels in this block, the data is compressed on the block basis so that the resolution is lowered undesirably. In the described case, the resolution is reduced to 1/3 both in the line and column directions. This, however, does not produce any significant degradation in the quality of the image because the requirement for resolution in the natural picture is not so high as that in the case is characters.

Figure 2B:
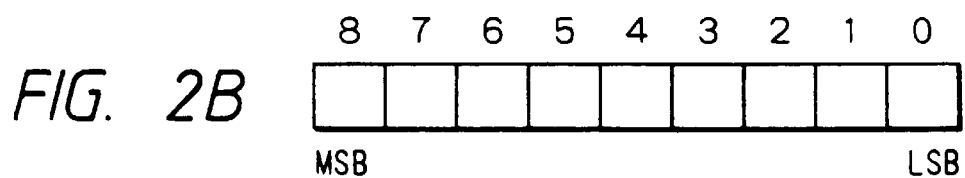

FIG. 2B shows the gradation data of the image pixels, while FIG. 2A shows bit numbers corresponding to the bits shown in FIG. 2B.

The text area is not formed into blocks so that a high resolution is obtainable. It is therefore possible to attain the qualities of the text and the image without requiring any increase in the memory capacity.

As has been described, the mean information quantity of the halftone image data per pixel stored in the page memory 6 is equal to that of the line image data, so that halftone image data and line image data can co-exist in the same memory.

The co-existence of the two types of data is possible even when the mean information quantity of the halftone image data per pixel is smaller than that of the line image data.

Figure 3:
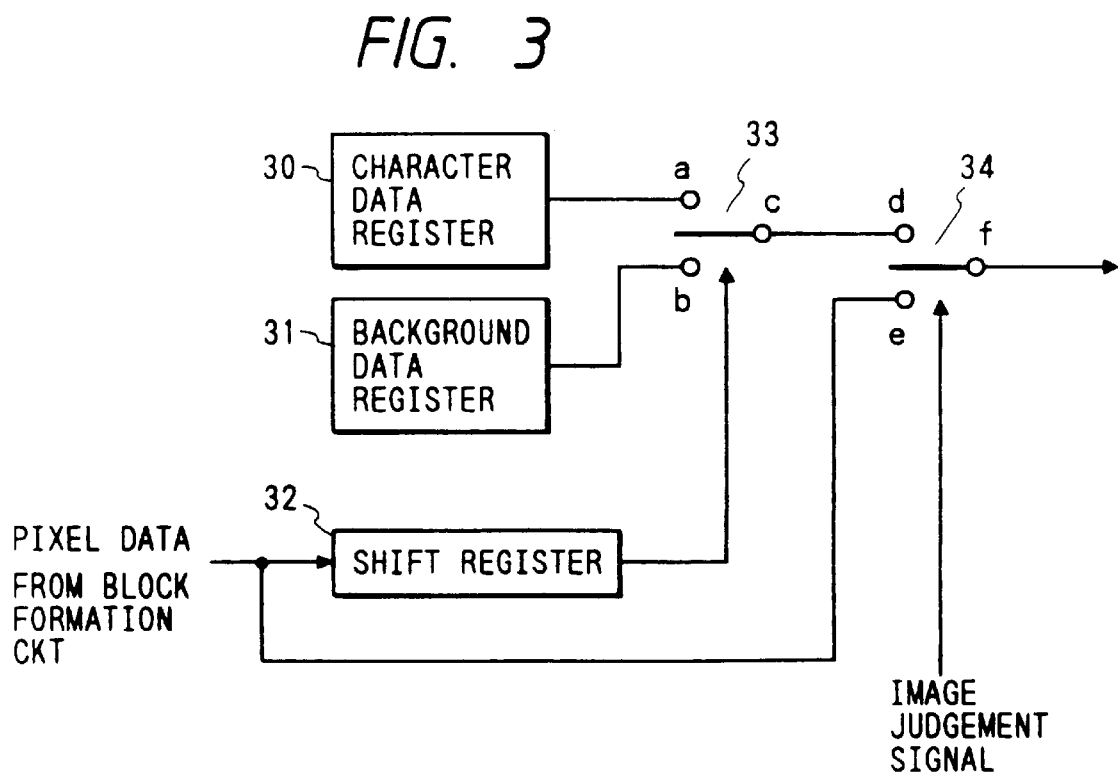
FIG. 3 is a block diagram of an example of a gradation adding circuit.

FIG. 3 is a block diagram showing an example of the internal structure of the gradation adding circuit 9. The gradation adding circuit 9 has a character gradation data storage register 30 for storing the gradation data of the character portions of the text, and a background gradation data storage register 31 for storing the gradation data of the background portion of the text. These registers 30 and 31 are connected to input terminals a and b of a first signal selector switch 33, respectively. Gradation data from, for example, the host computer 41 are beforehand stored in the character and background gradation data storage registers 30 and 31. For instance, the c character-gradation data is "1" for all bits, while the background gradation data is "0" for all bits, as explained before.

The pixel data of the block formed by the block forming circuit 8 is picked up by a shift register 32 bit by bit from the leftest one and is delivered to the first selector switch 33. The first selector switch 33 operates in accordance with the selector signal from the shift register 32 so as to select the character gradation data on the terminal a when the pixel carries the character data written thereon and the background gradation data b for the pixels on which characters are not written. The first selector switch 33 delivers the selected signal to a terminal d of a second selector switch 34. The second selector switch 34 operates in accordance with the image judging signal input from the image area detection circuit 5, such that it selects a signal on a terminal e (gradation data signal restored from the block pixel data) when the image judging signal indicates an image area and selects the signal on the terminal d when the image judging signal indicates an area outside the image area. The selected signal is output from the terminal f. Thus, adequate gradation data are selected for the pixels of the text area and the image area by the gradation adding circuit 9.

FIG. 1B is a block diagram of the whole image processing apparatus including the image processing unit 44 shown in FIG. 1A.

In FIG. 1B, numerals 41 denotes the host computer, 42 denotes an external memory device such as a hard disk or an optical-magnetic disk, 43 denotes an input device such as an image scanner capable of converting an original image into pixel data, a digitizer for appointing an area or a keyboard for entering commands and text characters, 44 denotes the image processing unit as shown in FIG. 1A, 45 denotes a later-mentioned image forming unit, 46 denotes a printer which is formed by the image processing unit 44 and the image forming unit 45, 47 denotes a communication device for transmitting and receiving processed image data, and 48 denotes a monitor for displaying the processed image data. The image forming unit 45, communication device 47 and the monitor 48 are supplied with data through the output terminal 11.

A description will be given of the image forming unit 45. Numeral 711 denotes a scanner having a laser output unit for converting the image signal from the output terminal 11 of the image processing unit 44 into light signals, a multi-surface, e.g., octagonal, polygon mirror 712, a motor (not shown) for rotatingly driving the mirror 712, an f/θ lens (image-forming lens) 713, and so forth. Numeral 714 denotes a reflective mirror for altering the path of the laser light, while 715 denotes a photosensitive drum 715. The laser beam emitted from the laser output unit is reflected by the polygon mirror 712 so as to raster-scan the surface of the photosensitive drum 715 through the lens 713 and the mirror 714, thereby forming a latent image corresponding to the original image.

Numeral 711 denotes a primary charger, 718 denotes a whole-area exposure lamp 718, 723 denotes a cleaner unit for collecting residual toner which has not been transferred, and 724 denotes a pre-transfer charger. These components are arranged around the photosensitive drum 715.

Numeral 726 designates a developing unit for developing the electrostatic latent image formed on the surface of the photosensitive drum 715. Numerals 731Y, 731M, 731C and 731Bk represent developing sleeves for conducting development in contact with the photosensitive drum 715, numerals 730Y, 730M, 730C and 730Bk represent toner hoppers for preserving fresh toner to be used, and 732 denotes a screw for feeding the toner. The developing unit 726 is composed of the sleeve 731Y to 731Bk, toner hoppers 730Y to 730Bk and the screw 732. These components are arranged around the axis P of rotation of the developing unit 726. For instance, the development of yellow color image is conducted with the sleeve 731Y held in contact with the photosensitive drum 751 as illustrated, whereas, for developing a magenta color image, the developing unit 726 is rotated about the axis P so as to bring the developing sleeve 731M into contact with the photosensitive drum 715. Likewise, development of cyan and black color images are conducted by rotating the developing unit 726 to bring the respective sleeves into contact with the photosensitive drum 715.

Numeral 716 designates a transfer drum for transferring the toner image from the photosensitive drum 715 to a paper. Numeral 719 designates an actuator plate for detecting the position of the transfer drum 716, 720 denotes a position sensor which senses the resetting of the transfer drum 716 to the home position upon sensing the approach of the actuator plate 719, numeral 725 denotes a transfer drum cleaner, numeral 727 denotes a paper pressing roller, numeral 728 denotes a charge remover and numeral 729 denotes a transfer charger. These components 719, 720, 725, 727 and 728 are arranged around the transfer roller 716.

Numerals 735 and 736 denote a paper feed cassette encasing the paper, 737 and 738 denote paper feed rollers for feeding paper from the cassettes 735, 736 and 739, 740 and 741 denote timing rollers for determining the timing of feed of the paper. The paper fed through the paper feeding mechanism having these components is led by a paper guide 749 and gripped at its leading end by a later-mentioned gripper and wound around the transfer drum 716 so as to be advanced to the image forming process.

A drum drive motor 550 is capable of synchronously rotating the photosensitive drum 715 and the transfer drum 716. The paper after the image forming process is separated from the transfer drum 716 by a separation claw 750 and is conveyed by a conveyor belt 742. Numeral 743 designates an image fixing portion which fixes the paper which has been conveyed by the conveyor belt 742. The image fixing portion 743 has a pair of heat-press rollers 744 and 745.

Although a laser beam printer performing electrophotographic process is specifically mentioned, it will be clear to those skilled in the art that the image forming unit 45 may be comprised of other types of printer such as a thermal transfer printer, dot printer or an ink jet printer.

In particular, a so-called bubble jet type printer, which incorporates a head of the type capable of discharging an ink droplet by membrane boiling effected by input of heat energy, is suitably used as the image forming unit 45.

Figure 1D:
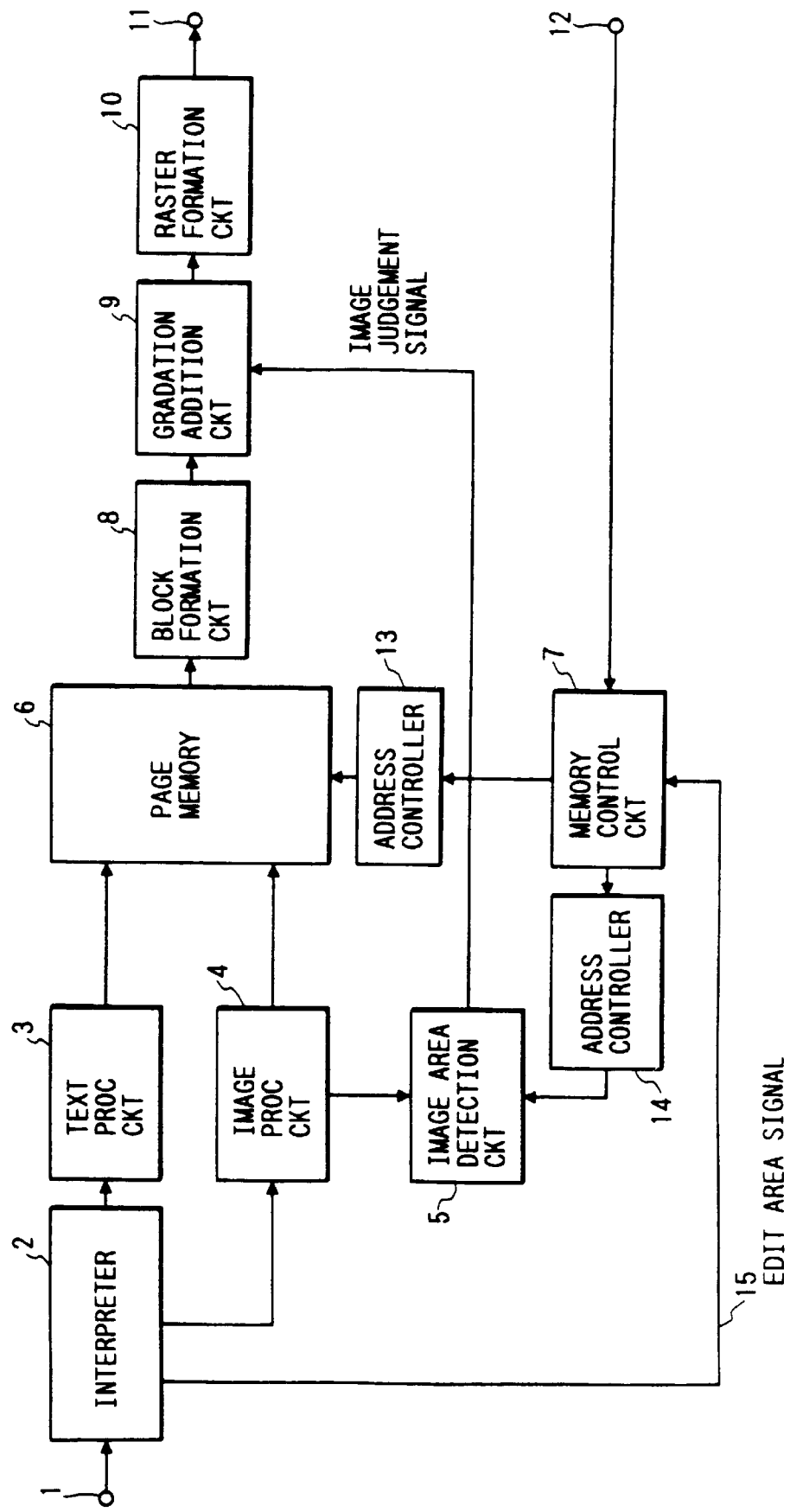

FIG. 1D shows a modification of the image processing unit shown in FIG. 1A. In this Figure, a reference numeral 15 denotes an edition area signal which is generated by appointment of coordinates entered through the input device 43 such as a digitizer or a keyboard. The edition area signal 15 is delivered to the memory control device through the host computer 41 and the interpreter 2. The memory circuit 7 controls the enable state of the address signals from the address controllers 13, 14 in accordance with the addition area signal 15, for the purpose of edition such as cutting out of the image within the designated area (trimming) and erasion of the image in the designated area (masking).

Figure 4:
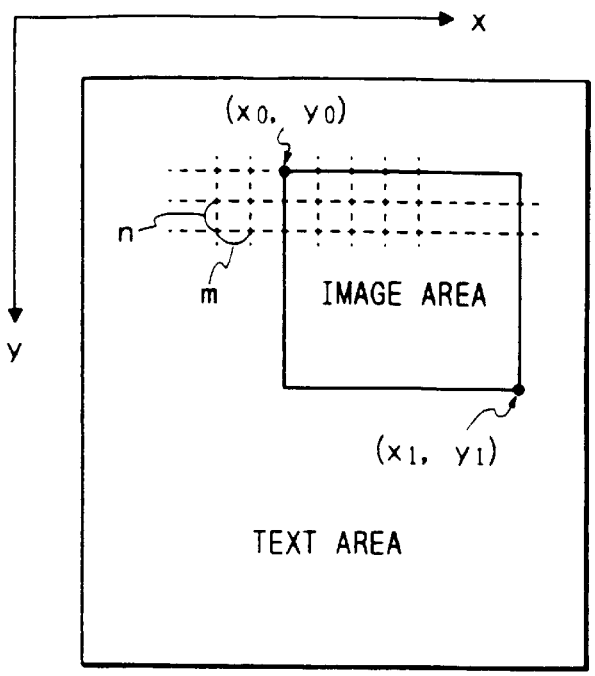
FIG. 4 is an illustration of an image area and a text area on a page.
Figure 5:
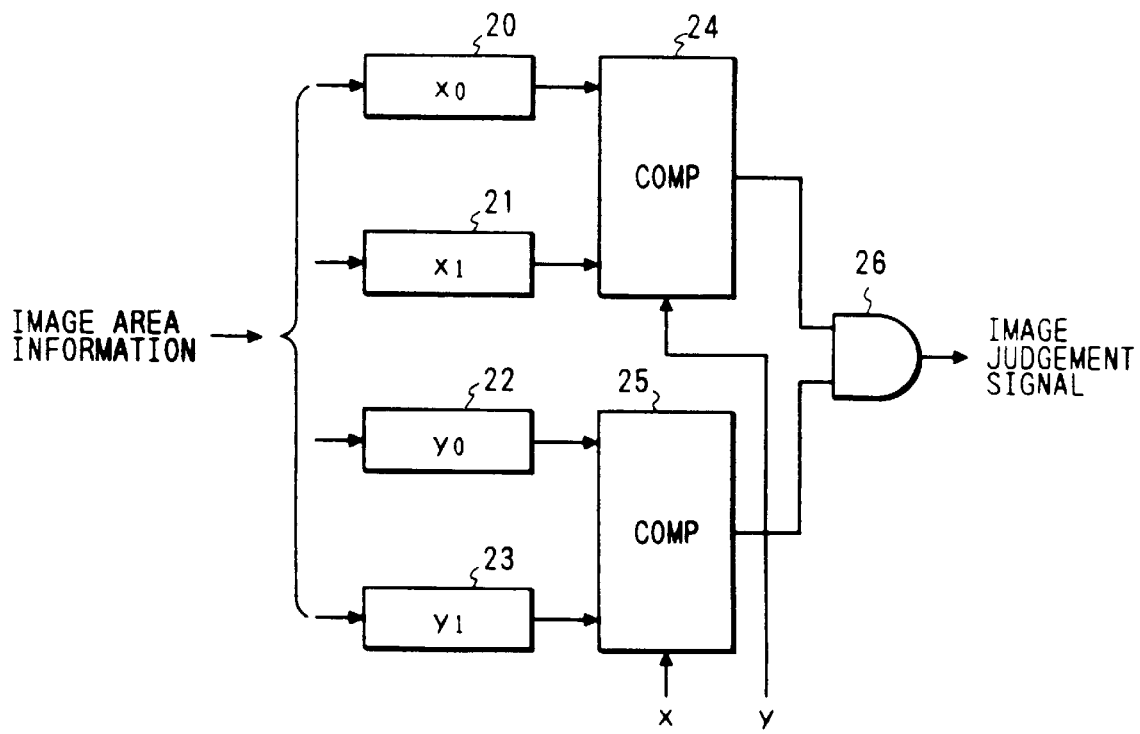
FIG. 5 is a block diagram of an image area detecting circuit.

FIG. 5 is a block diagram of another example of the image area detecting circuit 5. In this example, an image area is defined by the left upper corner point (x0, y0) (referred to as "start point" hereinafter) of a rectangle at which the scanning is commenced and the tight lower corner point (x1, y1) (referred to as "ending point", hereinafter) of the rectangle at which the scanning terminates, as will be seen from FIG. 4. In the following description, the directions of the main scan and sub-scan of the printer are referred to as "x direction" and "y direction", respectively. The x and y coordinate values (x0, y0) (x1, y1) of the starting and ending points are input from the image processing circuit 4 and are stored in registers 20, 21, 22 and 23. More specifically, the registers 20, 21, 22 and 23 store, respectively, the x coordinate x0 of the start point, x coordinate x1 of the ending point, y coordinate y0 of the start point and the y coordinate y1 of the ending point. The outputs from the first and second registers 20, 21 are connected to a first comparator circuit 24, while outputs from the third and fourth registers 22, 23 are connected to a second comparator circuit 25. The first and second comparator circuits 24, 25 also receive x and y coordinates values x, y of the pixel which is being read from the page memory 6.

The first comparator circuit 24 compares the x coordinate values x0, x1 of the starting and ending points with the x coordinate value x of the pixel which is being read from the page memory 6, and delivers to an AND circuit 26 a signal "1" on condition of $x0 \leq x \leq x1$ and a signal "0" on condition of $x<x0$ or $x>x1$. Similarly, the second comparator circuit 25 delivers to the AND circuit 26 a signal "1" on condition of $y0 \leq y \leq y1$ and a signal "0" on condition of $y<y0$ or $y>y1$. Consequently, the AND circuit 26 produces a signal "1" when both the conditions $x0 \leq x \leq x1$ and $y0 \leq y \leq y1$ are simultaneously met, and delivers a signal "0" otherwise, i.e., when one of the conditions $x<x0$, $x>x1$, $y<y0$ and $y>y1$ is met, thus enabling judgment of the image area. When a plurality of image areas exist in a frame, the circuit shown in FIG. 5 is arranged in plural and judgment of the image area is conducted on the basis of AND of the outputs of these circuits. This embodiment does not necessitates an area judging memory which is used in the example of the image area detecting circuit 5 for the purpose of storing the judging results of blocks of one frame.

In the described embodiment, the block forming circuit 8 is provided on the output side of the page memory 6. This, however, is only illustrative and the data block may be formed when the data is stored in the page memory 6. In such a case, the block forming circuit 8 can be dispensed with.

Although monochromatic image has been specifically mentioned in the foregoing description, it is possible to provide the page memory with a plurality of planes to enable processing of a color image. For instance, a full-color image processing is made possible by providing the page memory 6 with three planes of R, G and B and conducting the described image processing operation for each of these planes.

The number of gradations of the image area is determined in accordance with the performance of the image forming unit. Preferably, therefore, the size of the block is determined in accordance with the number of gradations which can be dealt with by the image forming unit. More specifically, when the image forming unit is capable of outputting $2^N$ gradation levels, the block size is preferably determined to contain N pixels. For instance, when the image forming unit is capable of expressing 16 gradation levels, storage of the image pixels in the form of blocks each containing 2×2 pixels suffices.

Thus, in the described embodiment of the present invention, gradation information is stored by using a plurality of pixels which are usable also as text pixels, so that a composite image containing both text image and gradation image can be stored in a common memory without requiring the memory capacity to be increased and without causing any degradation of qualities of both types of image.

Figure 6:
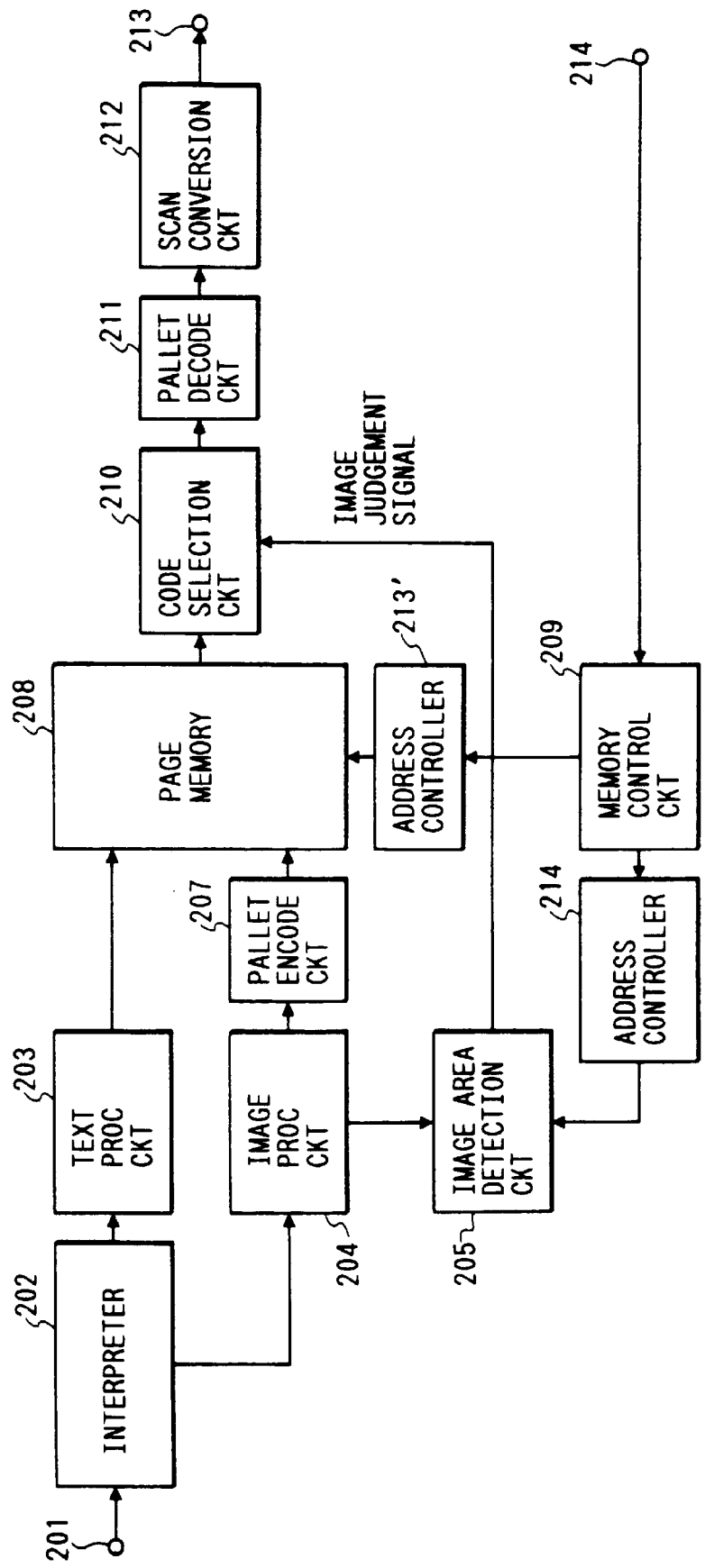
FIG. 6 is a block diagram of an image processing unit of a page printer as another embodiment.
Figure 7A:
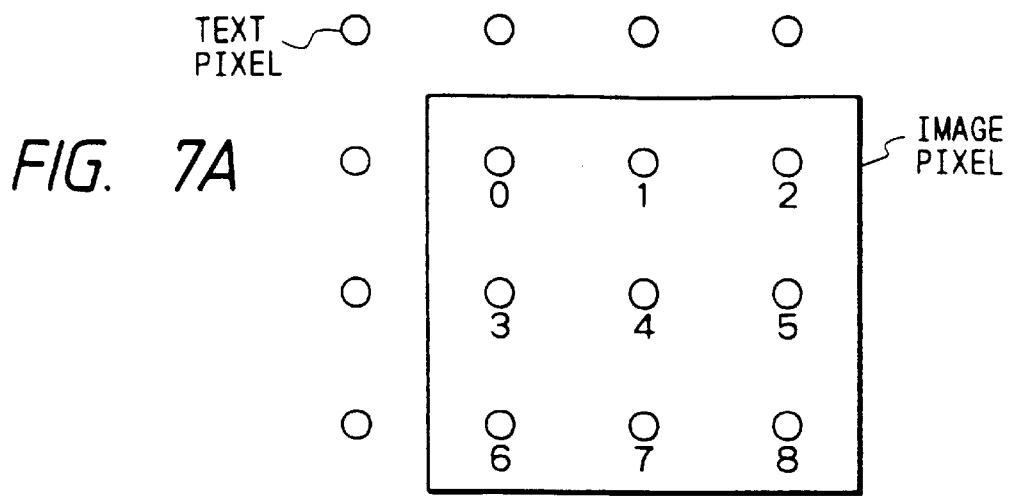
FIGS. 7A and 7B are illustrations of a relationship between image pixel and text pixel.

FIG. 6 is a block diagram of a second embodiment of the image processing apparatus of the present invention, more particularly an image processing unit of a page printer. An input terminal 201 receives commands and data entered through a host device such as a host computer or an image reader. The entered command aid data are input to the interpreter 202 and the interpreter 202 interprets the commands and data and delivers information such as characters or the like to a text processing circuit 203 and image information such as a photographic image to an image processing circuit 204. The text processing circuit 203 develops the text data into pixels which are the smallest units of the memory and writes the same in a page memory 206. The image processing circuit 204 conducts processing of an image data such as expansion or contraction of the image in accordance with the command, and delivers the result of the processing to a pallet encode circuit 207 and also to an image area judging circuit 205 which indicates the image area. The image area judging circuit 205 judges whether the data written in the page memory 205 is a text data or an image data, for each of blocks of N image pixels as shown in FIG. 7A and stores the result of judgment in the area judging memory (not shown). The result of the judgment is read from the area judging memory 5 in accordance with a timing input from a memory control circuit 209 and is delivered to a code selection circuit 210.

The image area detecting circuit 205 has an area judging memory of a bit size which is equal to that obtained when one bit is allocated all the image pixels on the page to be printed, assuming that all the pixels on the page are image pixels. The image area detecting circuit 205 execute the following steps of: (1) the bits on the area judging memory to "0"; (2) setting, each time the pallet code (output from a later-mentioned pallet end code circuit 207) is written in the page memory, the corresponding built of the area judging memory to "1"; (3) reading, each time data is read from the page memory 208, the value of the bit in the area judging memory corresponding to the rear pixel, and delivering the read value to a code selection circuit 210 as an image judging signal; and (4) writing "0" in the corresponding bit to initialize this bit. In this case, therefore, the area judging memory is required to have a size or storage capacity which is 1/S the capacity of the page memory 208, where S being the number of text pixels necessary for forming one image pixel.

The memory control circuit 209 controls the outputs from the output port (serial access port) of the page memory 208 and the image area judging circuit 205, in accordance with a synchronizing signal which is delivered by the image forming unit 45 (see FIG. 1B) through the input terminal 214. The pallet encode circuit 207 is a look-up table which converts the input image pixel data into pallet colors (representative colors). For instance, when image data corresponding to one image pixel is input by a 24-bit data (8-bits for each of red, green and blue colors), the pallet encode circuit 207 converts this 24-bit data into a 9-bit pallet code. Thus, 16,780,000 colors ($2^{24}$ colors) are represented by 512 ($2^9$) colors. The converted image data is written in the page memory 208. The page memory 208 is a dual port RAM having a capacity corresponding to the number of the text pixels contained in one page. The page memory 208 has a random access port (input port) to which are connected the text processing circuit 3 and the pallet encode circuit 207 mentioned before. The page memory 208 also has a serial access port (output port) to which is connected the code selection circuit 210. Thus, the text processing circuit 203 and the pallet encode circuit 207 stores the processing results in the page memory 208 at a corresponding addresses through the random access port. At the same time, the image data is serially output from the serial access port of the page memory 208 on the image pixel basis from the beginning end of the text in accordance with the synchronizing signal delivered from the image forming unit. The code selection circuit 210 operates in accordance with the control signal input from the image area judging circuit 205, i.e., the image judging signal. Namely, when the data input from the page memory 208 is image pixels, the code selection circuit 210 judges that the data is a pallet code and delivers to the pallet decode circuit 211 the pallet codes of a number equal to the number of the corresponding text pixels. On the other hand, when the data input from the page memory 208 is text pixels, the code selection circuit 210 examines the bit of each text pixel. When the value of the examined bit is "0", a previously set background pallet code is input to the pallet decode circuit 211, whereas, when the examined bit is "1", a previously set character pallet code is input to the pallet decode circuit 211.

Figure 8:
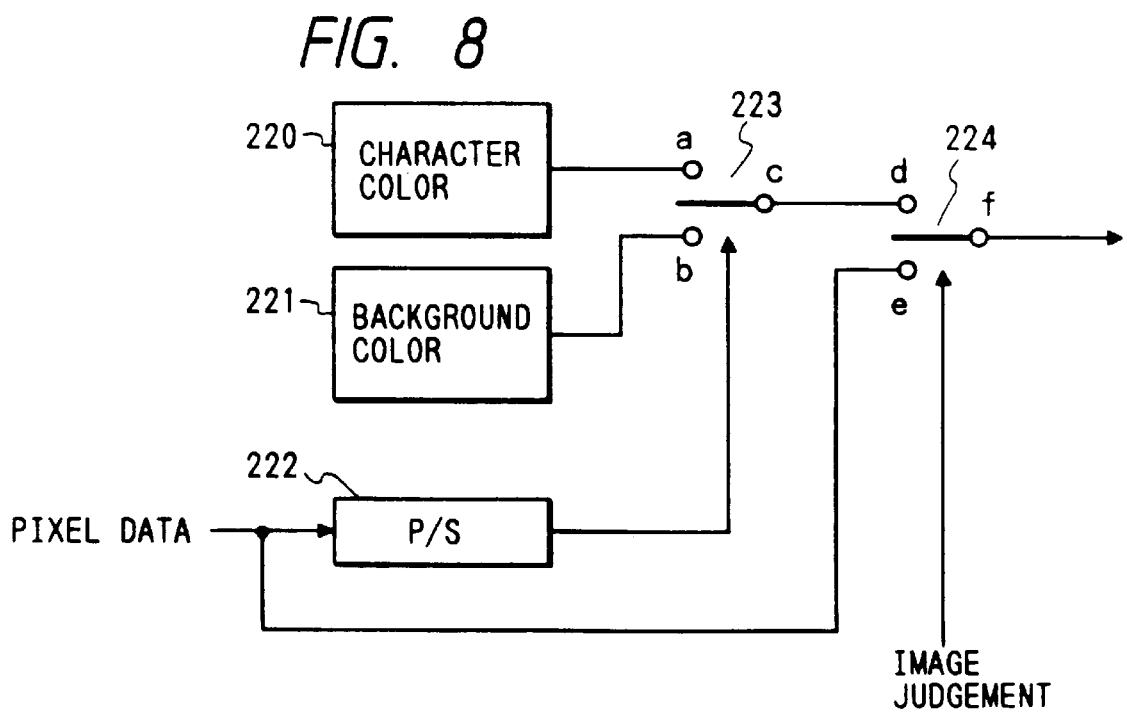
FIG. 8 is a block diagram of an example of code selection circuit.

FIG. 8 is a block diagram showing an example of the internal structure of the code selection circuit 210. A character color storage register 220 for storing pallet code of the character portion of a text and a background color storage register 221 for storing pallet code of the background portion of the text are connected to the input terminals a and b of the first signal selector switch 223, respectively. Pallet codes of the character portion and background portion are beforehand stored in the character color storage register 220 and the background color storage register 221, respectively.

Pixel data is input from the page memory 208 to the parallel/serial conversion circuit 222 which picks up the input pixel data in a bit-by-bit fashion and delivers it to the first selector switch 223 as a selector control signal.

The first selector switch 223 selects the terminal b, i.e., the background pallet code, when the selector control signal delivered from the parallel/serial conversion circuit 222 is "0", whereas, when the selector control signal is "1", it selects the terminal a, i.e., the character pallet-code. The first selector switch 223 delivers the selected code to a terminal d of a second selector switch 224. The second selector switch 224 also receives at its terminal e a data (pallet code) input from the page memory 208. The second selector switch 224 operates in accordance with the image judging signal delivered from the image area judging circuit 205 such that, when the input data is image pixel data, it delivers the pallet code on the terminal e, whereas, when the input data is text pixel data, it delivers the pallet code on the terminal d to the pallet decoder circuit 211.

The pallet decode circuit 211 is a look-up table for converting the pallet codes into input color signals and is adapted to generate, for example, 8-bit data for each of red, green and blue colors from a 9-bit pallet code. The color signal thus converted is rearranged by a scan conversion circuit 212 into a sequence conforming with the image forming unit 45 and is delivered to the latter through a terminal 213.

Figure 7B:
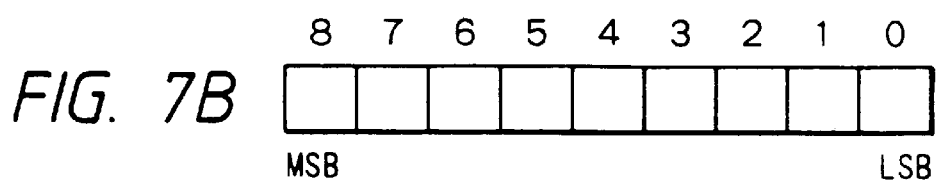

FIGS. 7A and 7B illustrate an example of the relationship between the text pixel and the image pixel. More specifically, FIG. 7A shows the relationship between the text pixels and image pixels on a page, while FIG. 7B shows the relationship between the bits of a pallet code and the numbers of the image pixels 0 to 8 on the page. As will be understood from these Figures, one image pixel is represented by 9 text pixels arranged in three lines and three columns. If one bit is allocated to one text pixel, the image pixel contains information of 9 bits, thus enabling expression of 512 colors. In the described embodiment, colors are expressed by pallet codes so that any 512 colors out of about 16,780,000 colors can be used provided that the signals for each of red, green and blue colors output from the pallet decode circuit 11 are of 8 bits.

The described embodiment is based upon recognition of the fact that the requirement for high resolution is less strict in a gradation image such as a photograph than in text images and that the colors in a frame can be compressed by making use of correlation of images and visual and recognition characteristics of human being. In the described embodiment, the color information of one image pixel is developed into 9 text pixels and the 9 text pixels are stored as one image pixel. It is therefore possible to efficiently store a composite image in which text and gradation images co-exist, without requiring any increase in the memory capacity. Needless to say, the number of bits of the color information is not limited to "9". Thus, the color information can have any integer number of bits not smaller than 2 according to the image quality required.

Figure 9:
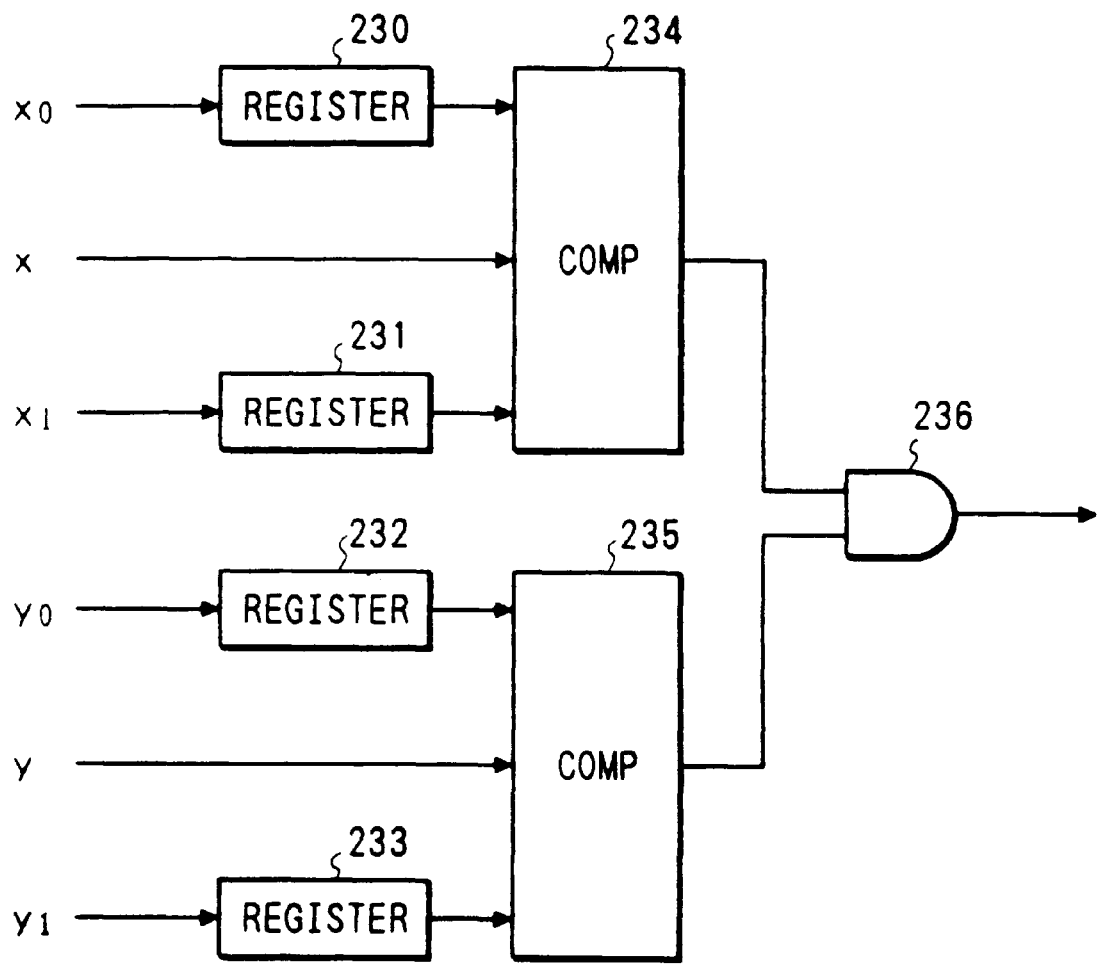
FIG. 9 is a block diagram of an image area judging circuit.

FIG. 9 is a block diagram of another example of the image area detecting circuit 205. In this example, an image area is defined by the left upper corner point (x0, y0) (referred to as "start point" hereinafter) of a rectangle at which the scanning is commenced and the right lower corner point (x1, y1) (referred to as "ending point", hereinafter) of the rectangle at which the scanning terminates, as will be seen form FIG. 4. In the following description, the directions of the main scan and sub-scan of the printer are referred to as "x direction" and "y direction", respectively. The x and y coordinate values (x0, y0) (x1, y1) of the starting and ending points are input from the image processing circuit 204 and are stored in registers 230, 232, 231 and 233. The outputs from the first and second registers 230, 231 are connected to a first comparator circuit 234, while outputs from the third and fourth registers 232, 233 are connected to a second comparator circuit 235. The first and second comparator circuits 234, 235 also receive x and y coordinates values x, y of the pixel which is being read from the page memory 208.

The x and y coordinate values of the start point and ending point (x0, y0), (x1, y1) are read from the image processing circuit 4 (see FIG. 9) and are stored in the registers 230, 232, 231 and 233.

The first comparator circuit 234 compares the x coordinate values x0, x1 of the starting and ending points with the x coordinate value x of the pixel which is being read from the page memory 208, and delivers to an AND circuit 236 a signal "1" on condition of x0≦x≦x1 and a signal "0" on condition of x<x0 or x>x1. Similarly, the second comparator circuit 235 delivers to the AND circuit 236 a signal "1" on condition of y0≦y≦y1 and a signal "0" on condition of y<y0 or y>y1. Consequently, the AND circuit 26 produces a signal "1" when both the conditions x0≦x≦x1 and y0≦y≦y1 are simultaneously met, and delivers a signal "0" otherwise, i.e., when one of the conditions x<x0, x>x1, y<y0 or y>y1 is met, thus enabling judgment of the image area.

When a plurality of image areas exist in a frame, the circuit shown in FIG. 9 is arranged in plural and judgment of the image area is conducted on the basis of AND of the outputs of these circuits. This embodiment does not necessitate an area judging memory which is used in the example of the image area detecting circuit 205.

Figure 10:
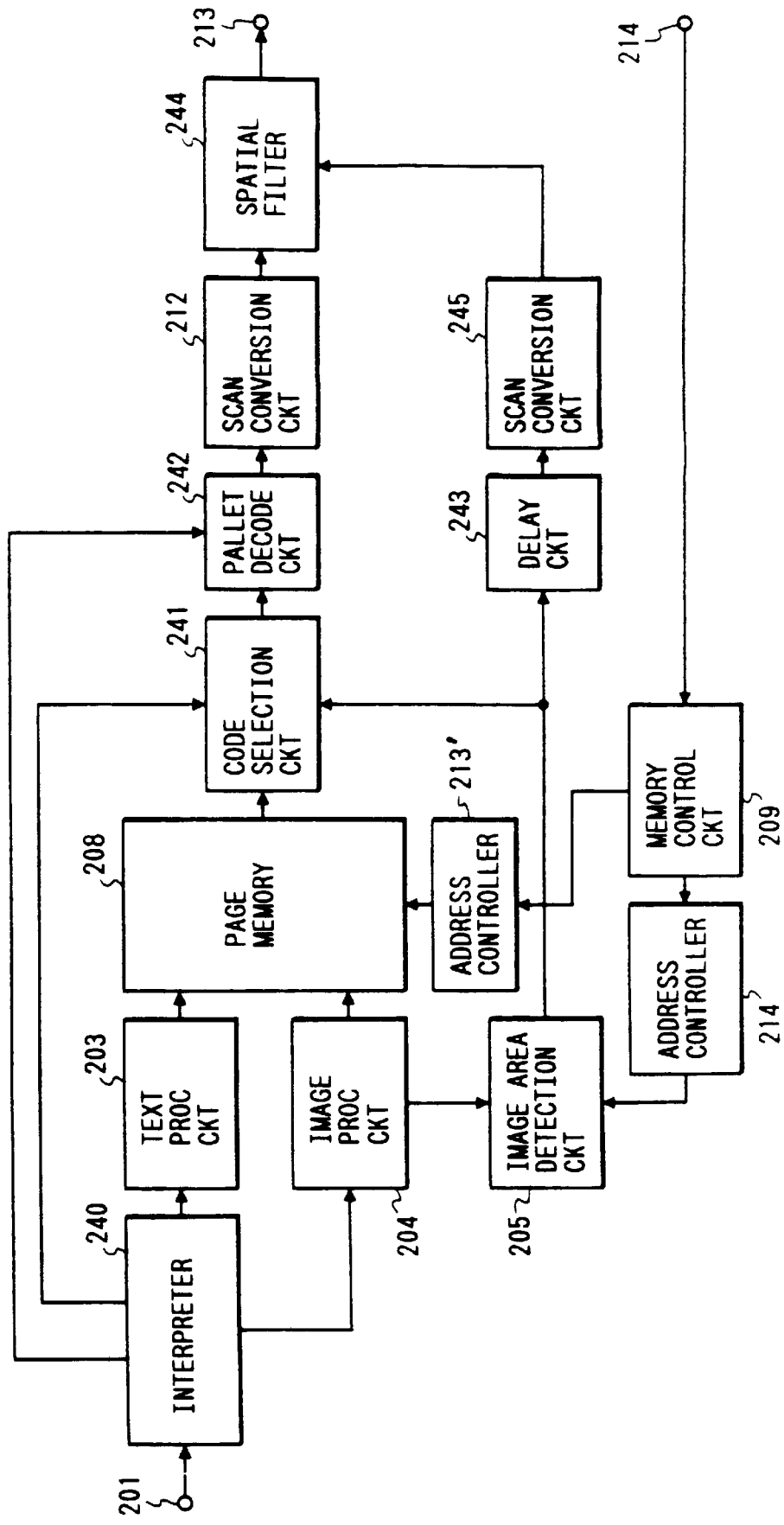
FIG. 10 is a block diagram of an image processing unit of a page printer as still another embodiment.

FIG. 10 is a block diagram of a different embodiment of the present invention in which the same reference numerals are used to denote the same parts or components as those in FIG. 6. The following description therefore will be concentrated only to the features which are not employed in the embodiment shown in FIG. 6.

In this embodiment, an input terminal 201 receives, from a host computer 41 (see FIG. 1B), data concerning the pallet decode table and also image data which has been concerted by the host computer 41 into pallet codes. Therefore, when a pallet decode table data is input, the interpreter 240 supplies the pallet decode circuit 242 with the table data so as to update the pallet decode table in the pallet decode circuit 242. On the other hand, when the data input through the input terminal is a pallet code which represents a character color or a background color, the interpreter 240 delivers the input data to the code selecting circuit 241. As explained before, the code selecting circuit 241 has a character color storage register and a background color storage register so that pallet codes of the character color and background color are stored in these registers.

The data processed by the image processing circuit 204 has already been converted into pallet code so that it is directly written in the page memory 208. By conducting the transfer of the image data from the host computer 41 in terms of the pallet code, it is possible to remarkably shorten the time required for the transfer. Furthermore, since the pallet decode circuit 242 in this embodiment is formed by a look-up table using a RAM, the table data can be updated on page basis, so that color conversion can be conducted easily by altering the data stored in the table by means of a CPU which is not shown.

This embodiment also features a spatial filter 244 which is connected to the output side of the scan conversion circuit 212. This spatial filter 244 receives an image area judging signal from the image area judging circuit 205 through a delay circuit 243 and a scan conversion circuit 245. The delay circuit 243 is a circuit for delaying the image area judging circuit for a predetermined time, while the scanning conversion circuit 245 is a circuit which conducts the same conversion as that performed by the scan conversion circuit 212.

The spatial filter 244 passes the input pixel data without effecting any processing when the input pixel data is text pixel data. When the input pixel data is image pixel data, however, the spatial filter 244 conducts smoothing of the boundaries of the blocks. The smoothing can be conducted by using a known algorithm. Consequently, the block distortion in the image area is removed and generation of false profile is avoided in the text area, without causing degradation of the block distortion.

As will be understood from the foregoing description, the illustrated embodiments offers the following advantages. Namely, color information of image pixels in an composite image containing both an image and a text is stored efficiently so that high qualities of both the image with color information and text image are maintained without requiring any increase in the storage capacity of the memory. The addition, a further efficient use of memory capacity is made possible since the color information of image pixels is stored in a compressed manner.

Furthermore, the transfer of image data from a hoist device such as a host computer is effected in a compressed manner so that the time required for the transfer of the image pixels is remarkably shortened to achieve a higher processing speed.

Furthermore, since the smoothing is effected only on the image area, any block distortion in the image area can be eliminated without causing deterioration of the quality of the text area and generation of false profile due to compression of color image can be avoided.

Figure 11:
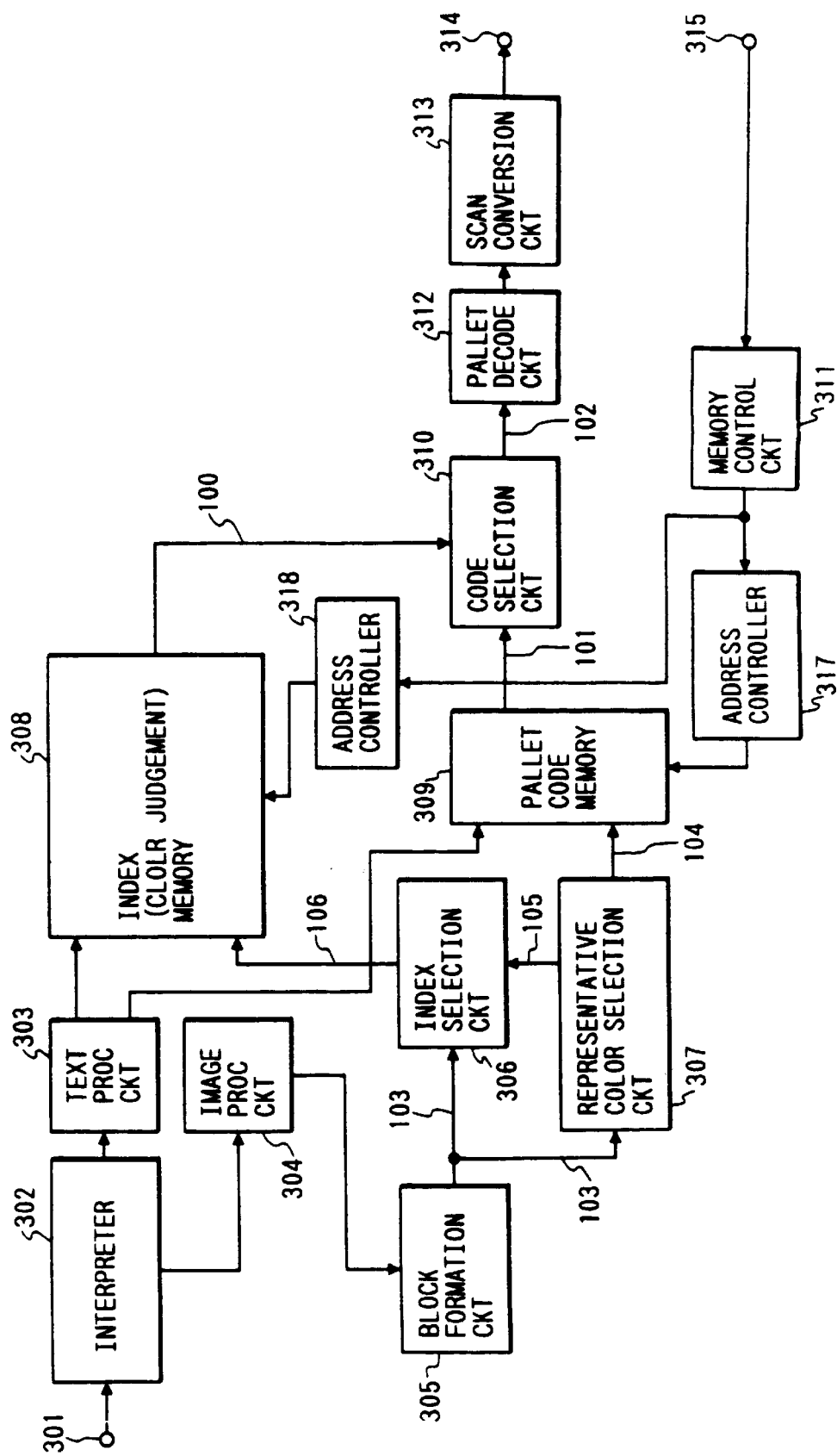
FIG. 11 is a block diagram of an image processing unit of a page printer as a further embodiment.
Figure 12:
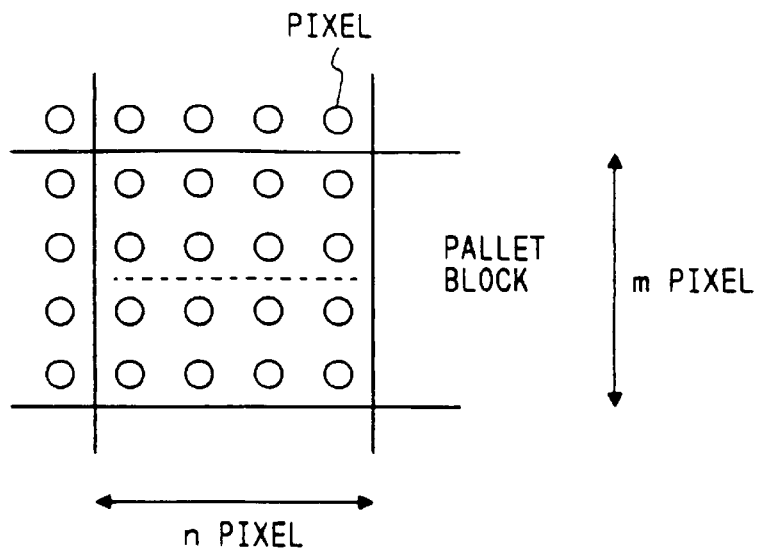
FIG. 12 is an illustration of a pallet block.

FIG. 11 is a block diagram of a third embodiment of the image processing apparatus of the present invention, more specifically an image processor of a page printer. An input terminal 301 of the apparatus receives commands and data input from an external device such as a host computer 41. The input commands and data are delivered to an interpreter 302 which interprets the commands and data so as to deliver text information (characters or the like) to a text processing circuit 302 and image information such as a photograph to an image processing circuit 304. The text processing circuit 303 develops the text data into pixels which are the smallest units of memory and writes the pixel data in an index memory 308 in units of pallet blocks which will be described later. At the same time, the text processing circuit 303 writes later-mentioned pallet codes of the character portion and the background portion of the text in a pallet code memory, 309. On the other hand, the image processing circuit 304 conducts processing of image data corresponding to the command, e.g., expansion, contraction and rotation, so as to apply the processed image data to a block forming circuit 305. The block forming circuit 305 forms the pixels into pallet blocks having N pixels (N=m×n) by a known method employing a line memory or the like means, as shown in FIG. 12. Symbols m and n represent integers which are not smaller than 2. In the arrangement shown in FIG. 12, both m and n are 4 so that each pallet block contains 16 pixels. The pallet blocks each containing N pixels are delivered through a signal line 103 to an index selection circuit 6 and a representative color selection circuit 307. The representative color selection circuit 7 selects two colors out of the N pixels and outputs the selected colors in the form of pallet codes. An example of the construction of the representative color selection circuit 307 is shown in FIG. 13.

Figure 13:
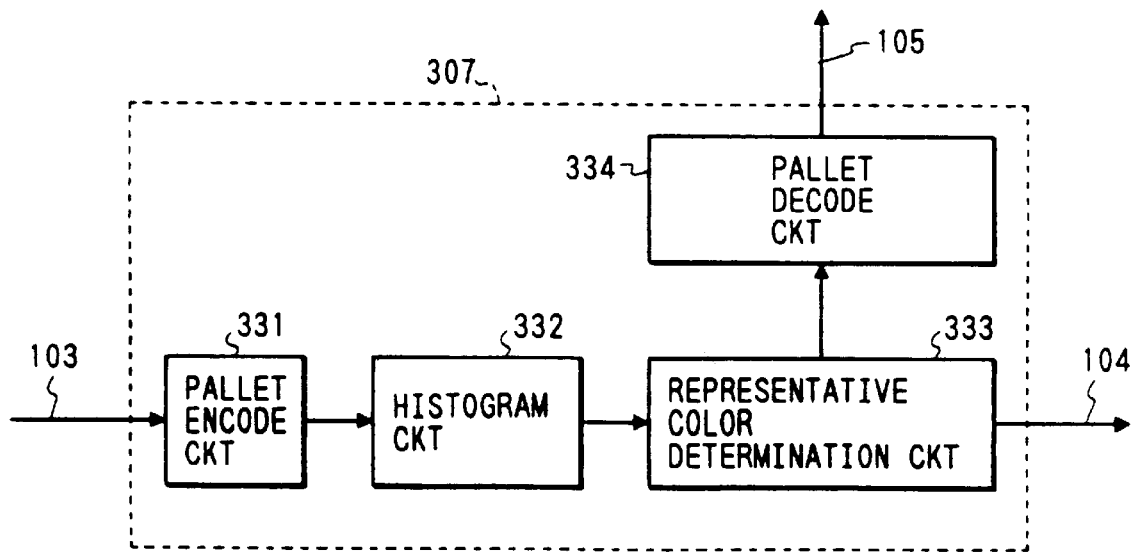
FIG. 13 is a block diagram of an example of a representative color selection circuit.

Referring to FIG. 13, the N pieces of pixel data input on the block basis from the signal line 103 are input to a pallet code forming circuit 331. This circuit 331 is a look-up table for converting the input pixel data into pallet colors (representative colors) and is composed of a RAM or a ROM. For instance, when one pixel data is input with 8 bits for each of red, green and blue colors, the 24-bit data (8×3=24) is converted into a pallet code of 8 bits. Thus, 16,780,000 ($2^{24}$) colors are represented by 256 ($2^8$) colors.

The pixel data converted into the pallet code by the pallet code forming circuit 331 is input to a representative color determining circuit 333 through a histogram generating circuit 332. The histogram generating circuit 332 generates a histogram concerning the frequency of occurrence of each pallet code. The representative color determining circuit 333 selects two pallet codes, i.e., a pallet code of the greatest appearance frequency and the pallet code of the frequency next to the greatest frequency, in accordance with the histogram. The representative color determining circuit then writes through the signal line 104 the selected pallet codes in the pallet code memory 309 and also to a pallet decode circuit 334. The pallet decode circuit 334 restores the original pixel data from the input pallet codes of two colors. The restored data is supplied to the index selection circuit 306 through the signal line 105.

Although two colors of the greatest and next to the greatest appearance frequencies are selected in the described embodiment, this is only illustrative and the arrangement may be such that two representative colors are selected so as to minimize the error in the block caused by the use of these representative colors by, for example, least square method.

The index selection circuit 306 is a circuit which determines to which one of the two representative colors the pixels in the block are to be allocated. An example of the construction of the index selection circuit 306 is shown in FIG. 14.

Figure 14:
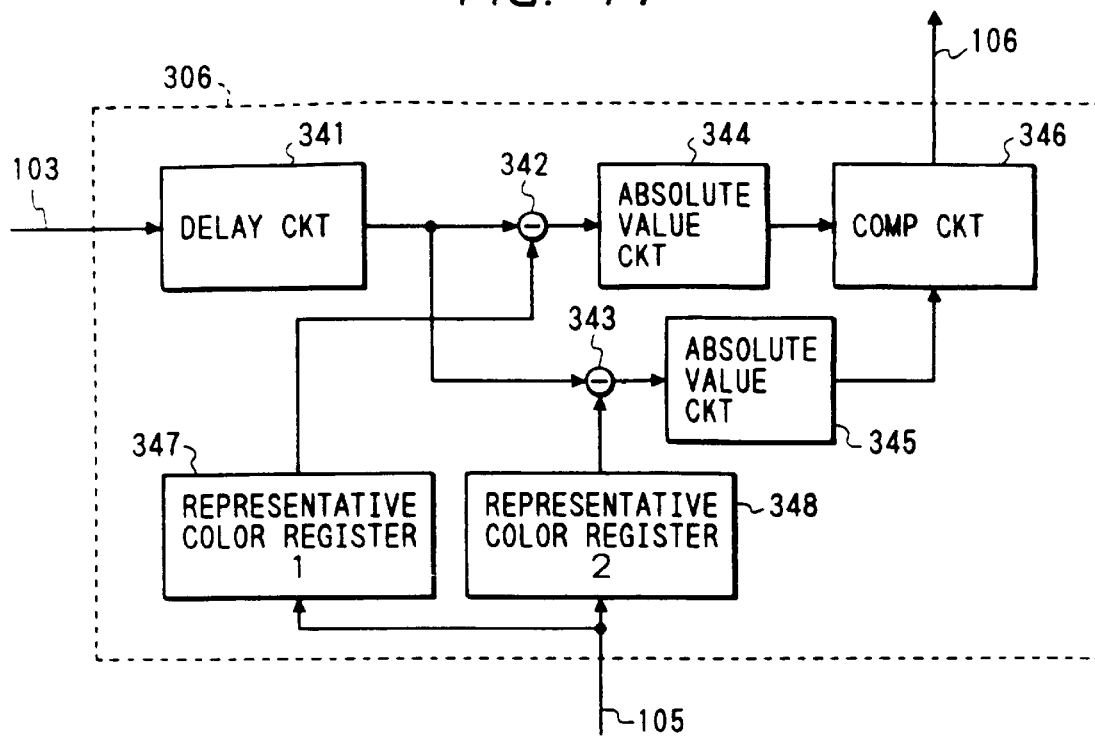
FIG. 14 is a block diagram of an example of an index selection circuit.

Referring to FIG. 14, the pixel data input from the block forming circuit 305 through the signal line 103 is input to a delay circuit 341 and the aforementioned two representative colors input through the signal lines 105 are input to first and second representative color registers 347, 348. The delay circuit 341 delays the output of the input pixel data until the two representative colors are stored in the representative color registers 347, 348. After the storage of the representative colors, the delay circuit delivers the delayed input data to first and second subtracting units 342, 343. The first and second subtracting units 342, 343 compute the differences $D_1$ and $D_2$ between the pixel data and the first and second representative colors and deliver the computation results to first and second absolute value circuits 344, 345. The first and second absolute value circuits 344, 345 deliver the absolute values $|D_1|$ and $|D_2|$ to of the differences $D_1$ and $D_2$ to a comparator 346. The comparator 346 compares the absolute values $|D_1|$ and $|D_2|$ with each other and produces an output "0" on condition of $|D_1| \leq |D_2|$ and "1" on condition of $|D_1| > |D_2|$ and delivers this output as an index to an index memory 308 through a signal line 106.

As a result of the described operation, resolution information and color information are respectively written in the index memory 308 and the pallet code memory 309.

Thus, in the illustrated embodiment, the image data on the page is divided into minute blocks each having a plurality of pixels and the content of each block is expressed in terms of two representative colors, the pallet codes of the two representative colors and the index ("0" or "1") of the representative color allocated to the pixels in the block are stored in the respective memories. It is therefore possible to store a composite image containing both full-color text and image by a memory of a small capacity, without causing any degradation in the resolution. In addition, since no distinction is necessary between the text portion and the image portion, the construction of the processing circuit is simplified and the speed of processing is enhanced.

A description will be given of the reading operation, hereinunder.

The memory control circuit 311 operates in accordance with a synchronizing signal which is input through the input terminal 315 from the image forming unit 45 so as to control the index memory 308 and the pallet code memory 309 such that data stored in these memories are read on block basis from the leading end of the page. The code selection circuit 310 is a circuit for allocating pallet codes to pixels in the block. An example of the construction of the code selection circuit 310 is shown in FIG. 15.

Figure 15:
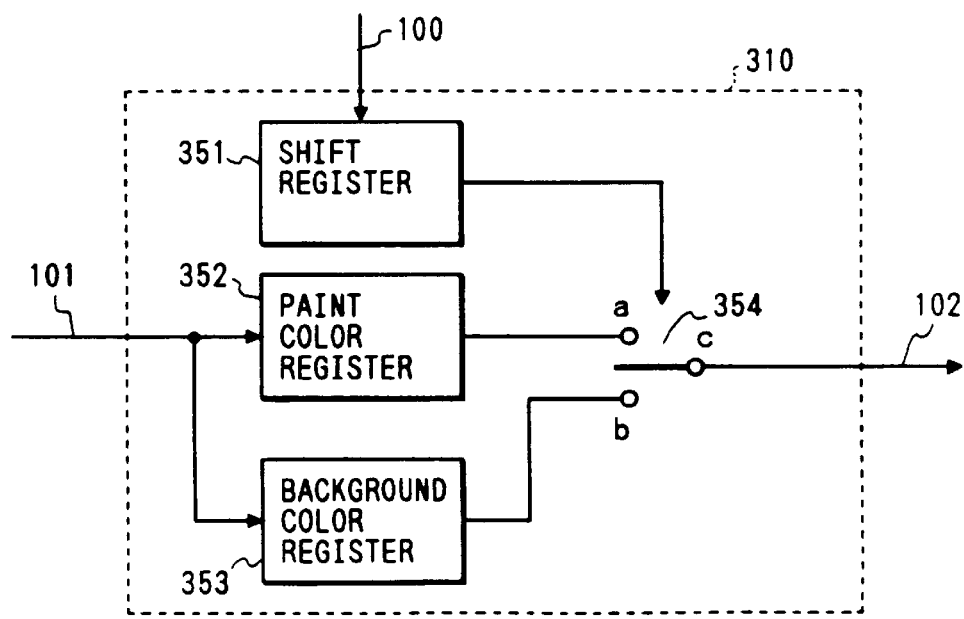
FIG. 15 is a block diagram of an example of a code selection circuit.

Referring to FIG. 15, two representative color pallet codes are read from the pallet code memory 309 through the signal line 101. One of these two pallet codes, corresponding to the index "1", is stored in a paint color register 352, while the pallet code corresponding to the index "0" is stored in the background color register 353. On the other hand, the indices of the pixels of the block read from the index memory 308 through the signal line 100 are temporarily stored in a shift register 351 and are picked up one by one so as to be delivered to a control terminals of a switch 354. More specifically, the pallet code corresponding to the index "1" is applied by the paint color register 352 to a terminal a of the switch 354, while the pallet code corresponding to the index "0" is applied by the paint color register 353 to a terminal b of the switch 354. The switch 354 operates in accordance with an index signal supplied by a shift register 351 so as to connect a common terminal c to the terminal a when the index is "1" to the terminal b when the index is "0".

As a consequence, pallet codes corresponding to the indices of the respective pixels are sequentially delivered to the signal line 102 and are applied to the first pallet decode circuit 312. The pallet decode circuit 312 then restores the original pixel data (8-bit data for each of red, green and blue colors) from the pallet code and delivers the pixel data to a scan conversion circuit 313 which converts the pixel data into a form which conforms with the image forming unit 45 and then delivers the converted data to a printer engine through the output terminal 314.

In general, the number of colors appearing in one frame is not so large. In addition, a reduction in the number of colors is allowable considering the visual color discrimination power of human eyes. With these knowledges, in the described embodiment, the number of colors expressed is reduced to enable a reduction in the memory capacity. Assuming that the bit number of the input pixel is 24 (8 bits for each of red, green and blue colors), any desired 256 colors ($2^8$=256) are selected out of 16,780,000 ($2^{24}$) colors and different codes are allocated to these selected colors, thus enabling these colors to be expressed in terms of codes. To this end, the pallet code forming circuit 331 for converting the input pixel data into pallet codes and the pallet decode circuits 312, 334 for converting the pallet codes into input pixel data are constructed with rewritable look-up tables, e.g., RAMs, so as to enable updating of the contents of these circuits by a host computer 41. It is therefore possible to change the above-mentioned 256 colors as desired.

As will be understood from the foregoing description, the illustrated image processing apparatus can store a composite image containing both full color text and image by using a memory of a small capacity, without causing any degradation in the resolution of the text, by virtue of the fact that the image data is divided into a multiplicity of minute blocks and the representative color codes of the blocks and the indices of the pixels are respectively stored. Furthermore, the circuit construction can be made simpler and high-speed operation is made possible, since no distinction is necessary between the text area and the image area.

Although the invention has been described through its specific forms, it is to be understood that the described embodiments are only illustrative and various changes and modifications may be imparted thereto without departing from the scope of the invention which is limited solely by the appended claims.

What is claimed is:

1. An image processing method comprising the steps of:
   inputting a command and data, the data including text information and image information;
   interpreting the command and generating a plurality of kinds of pixel data based on the data, a part of the plurality of kinds of pixel data being expressed in a compressed form; and
   storing the plurality of kinds of pixel data in a memory, wherein the plurality of kinds of pixel data is expressed on a pixel basis and a part of the pixel data is compressed pixel data while other pixel data is non-compressed image data.

2. A method according to claim 1, wherein the command is described by a page description language.

3. A method according to claim 1, wherein the image information consists of multi-level data having n bits, wherein n>1.

4. A method according to claim 3, wherein the image information consists of color image data having a plurality of color components.

5. A method according to claim 1, wherein the memory is a page memory.

6. A method according to claim 1, further comprising the step of separating each of the plurality of kinds of pixel data.

7. A method according to claim 6, wherein the separation in said separating step is performed on the basis of the command.

8. A method according to claim 1, wherein one of the plurality of kinds of pixel data is image information.

9. A method according to claim 1, wherein one of the plurality of kinds of pixel data is compressed in units of two-dimensional blocks.

10. A method according to claim 9, wherein one of the plurality of kinds of pixel data is compressed by reducing the number of colors within the block.

11. An image processing method comprising the steps of:
    inputting a command and data described in a page description language;
    interpreting the command and extracting text information and image information from the data;
    developing the text information and generating first pixel data;
    developing the image information and generating second pixel data;
    compressing the second pixel data in units of two-dimensional pixel blocks without compressing the first pixel data; and
    storing the first pixel data and the compressed second pixel data in a memory.

12. A method according to claim 11, wherein the image information consists of multi-level data having n bits, wherein n>1.

13. A method according to claim 12, wherein the image information consists of color image data having a plurality of color components.

14. A method according to claim 11, wherein the memory is a page memory.

15. A method according to claim 11, further comprising the step of reading out the first pixel data and the second pixel data from the memory to form printing data.

16. A method according to claim 15, wherein the printing data is raster data, and is supplied based on a predetermined sync signal to an image forming unit for forming an image on a medium.

* * * * *

UNITED STATES PATENT AND TRADEMARK OFFICE
CERTIFICATE OF CORRECTION

PATENT NO.   : 5,926,292
DATED        : July 20, 1999
INVENTOR(S)  : HISASHI ISHIKAWA ET AL.                 Page 1 of 2

It is certified that error appears in the above-identified patent and that said Letters Patent is hereby corrected as shown below:

On the title page:

AT [30] FOREIGN APPLICATION PRIORITY DATA

Insert:
--[30] FOREIGN APPLICATION PRIORITY DATA
November 20, 1989 [JP] Japan .......... 1-301477
November 20, 1989 [JP] Japan .......... 1-301478
November 20, 1989 [JP] Japan .......... 1-301479--.

AT [56] REFERENCES CITED

U.S. PATENT DOCUMENTS

"3,555,262  1/1971" should read --3,555,262  5/1968--;

COLUMN 1

Line 42, "that" should read --as that--; and
    Line 55, "that" should read --as that--.

COLUMN 2

Line 9, "capable" should read --capable of--.

COLUMN 6

Line 31, "numerals" should read --numeral--.

UNITED STATES PATENT AND TRADEMARK OFFICE
CERTIFICATE OF CORRECTION

PATENT NO.    : 5,926,292
DATED         : July 20, 1999
INVENTOR(S)   : HISASHI ISHIKAWA ET AL.

It is certified that error appears in the above-identified patent and that said Letters Patent is hereby corrected as shown below:

<u>COLUMN 11</u>

Line 36, "form" should read --from--.

Signed and Sealed this

Nineteenth Day of September, 2000

Attest:

Q. TODD DICKINSON

*Attesting Officer*    *Director of Patents and Trademarks*